United States Patent [19]

Takahashi

[11] Patent Number: 4,763,060

[45] Date of Patent: Aug. 9, 1988

[54] AC MOTOR DRIVE METHOD AND SYSTEM USING A PULSE WIDTH MODULATED INVERTER

[75] Inventor: Isao Takahashi, Nagaoka, Japan

[73] Assignee: Sanken Electric Co., Ltd., Saitama, Japan

[21] Appl. No.: 916,386

[22] Filed: Oct. 8, 1986

[30] Foreign Application Priority Data

May 5, 1986 [JP] Japan .................................. 61-47875

[51] Int. Cl.⁴ .............................................. H02P 5/28
[52] U.S. Cl. .................................... 318/811; 318/801; 318/803; 363/41
[58] Field of Search ............... 318/811, 803, 721, 799, 318/801, 220, 221; 363/79, 41

[56] References Cited

U.S. PATENT DOCUMENTS

| | | | |
|---|---|---|---|
| 4,356,544 | 10/1982 | Ono et al. | 318/811 |
| 4,357,655 | 11/1982 | Beck | 318/811 |
| 4,477,763 | 10/1984 | Asano et al. | 318/811 |
| 4,575,667 | 3/1986 | Kurakake | 318/811 |
| 4,656,572 | 4/1987 | Caputo et al. | 318/811 |

OTHER PUBLICATIONS

Tung Hai Chin, Motomu Nakana, Yutaka Fuwa, New PWM Technique Using a Triangular Carrier Wave of Saturable Amplitude, May/Jun. 1984, IEEE Transactions on Industry Applications, vol. IA-20, No. 3, pp. 643-650.

Primary Examiner—William M. Shoop, Jr.
Assistant Examiner—Brian Young
Attorney, Agent, or Firm—Woodcock Washburn Kurtz Mackiewicz & Norris

[57] ABSTRACT

An induction motor is driven from an inverter having switches activated in prescribed on off patterns to provide a series of voltage vectors for creating a revolving field vector in the motor, and a zero vector for arresting the rotation of the field vector. Memories are provided on which are written voltage vector data and zero vector data. A readout control circuit reads out the voltage vector data and zero vector data from the memories with preassigned constant cycles in order to cause the inverter to generate in real time the corresponding voltage vectors and zero vectors needed for motor speed control. Each cycle consists of a first variable length segment during which the voltage vector data are read out to cause the inverter to generate the voltage vectors in a predetermined sequence and at predetermined time intervals, and a second variable length segment during which the zero vector data are read out. The readout control circuit controls the motor speed by controllably varying the relative lengths of the two segments of the successive cycles, with the second segment of each cycle made shorter for a higher motor speed and longer for a lower motor speed.

9 Claims, 5 Drawing Sheets

| ADDRESS | | 0 | 1 | 2 | 3 |
|---|---|---|---|---|---|
| (00) | FORWARD PWM PATTERN MEMORY M1 | $V_6$ (110) | $V_2$ (010) | $V_6$ (110) | $V_2$ (010) |
| (01) | FORWARD ZERO VECTOR MEMORY M2 | $V_7$ (111) | $V_0$ (000) | $V_7$ (111) | $V_0$ (000) |
| (10) | REVERSE PWM PATTERN MEMORY M3 | $V_1$ (001) | $V_5$ (101) | $V_1$ (001) | $V_5$ (101) |
| (11) | REVERSE ZERO VECTOR MEMORY M4 | $V_0$ (000) | $V_7$ (111) | $V_0$ (000) | $V_7$ (111) |

AC MOTOR DRIVE METHOD AND SYSTEM USING A PULSE WIDTH MODULATED INVERTER

BACKGROUND OF THE INVENTION

My invention relates to the speed control of electric motors, and more specifically to a method of, and a system for, driving an alternating current (AC) motor through a pulse width modulated inverter.

The technique of pulse width modulation (PWM) is well known by which an inverter operating from a fixed voltage, direct current (DC) supply can generate an AC output of variable frequency and voltage. Also known is the application of a PWM inverter for the speed control of an AC motor, as disclosed for example in the article entitled "New PWM Technique Using a Triangular Carrier Wave of Saturable Amplitude", by Tung Hai Chin et al., in the Vol. 1A-20, No. 3, May/June 1984 issue of *IEEE Transactions on Industry Applications*.

The PWM inverter for such motor speed control may have three pairs of switching devices such as transistors for driving a three phase motor. Conventionally, the three pairs of inverter switches have usually been activated independently by three different control signals. The phase relationship of the three phase control signals must be so critical that it has often been difficult to operate the inverter in a manner optimum for the desired motor speed control.

An obvious solution to this problem is the joint control of the inverter switches, as described and claimed in Asano et al. U.S. Pat. No. 4,477,763, dated Oct. 16, 1984. This patent teaches the driving of a three phase AC motor or like rotary machine by six different voltage vectors for creating a rotary magnetic flux in the motor, and a zero vector for arresting the rotation of the magnetic flux, the voltage vectors and zero vector being both determined by prescribed on off patterns of the inverter switches. The on off patterns of the inverter switches for the production of the desired voltage vectors and zero vector may previously be written on a memory or storage. This memory may then be read for activating the inverter switches in real time. Alternatively, the required inverter control signals may be generated without use of a memory, and their frequencies may be varied for correspondingly changing the output frequency of the inverter.

Either way, the output frequency of the inverter has been variable only by changing the frequency of the clock signal used as a time base for the inverter control signals. Changing the frequency of the clock signal is itself an easy task: A variable frequency source such as a voltage controlled oscillator (VCO) may be employed as a source of the clock signal, its frequency being variable by changing the applied voltage. However, not only is such a variable frequency source significantly more expensive than a fixed frequency source, but further its response is not so quick as can be desired for accurate motor speed control. This latter drawback manifests itself as an even more serious problem when the motor is being driven at ultralow speed.

SUMMARY OF THE INVENTION

I have hereby discovered how to drive an AC motor via a PWM inverter with use of a significantly simpler, less expensive circuit configuration than heretofore and without the noted drawbacks of the prior art.

According to my invention, briefly stated in one aspect thereof, there is provided a method of controllably driving an AC motor by a plurality of prescribed voltage vectors for creating a rotary field vector in the motor and by a zero vector for arresting the rotation of the field vector, the voltage vectors and zero vector being determined by prescribed on off patterns of switches in an inverter connected to the motor. The method of my invention specifically comprises causing the inverter to generate the voltage vectors and zero vector with preassigned constant cycles each having a first variable length segment during which the voltage vectors are generated in a predetermined sequence and at predetermined time intervals, and a second variable length segment during which the zero vector is generated. The motor speed can be varied as required by controlling the relative lengths of the first and second segments of the successive cycles in such a manner that the second segment of each cycle becomes shorter for a higher motor speed and longer for a lower motor speed.

My invention also provides, in another aspect thereof, an AC motor drive system operating in accordance with the above summarized method. A preferred construction of the drive system includes memory means having written thereon both voltage vector data representative of the on off patterns of the inverter switches for the production of the voltage vectors in a predetermined sequence, and zero vector data representative of the on off pattern of the inverter switches for the production of the zero vector. The inverter switches are activated by a switch control circuit as dictated by the voltage vector data and zero vector data read out from the memory means. It will be seen, then, that all that is needed for the practice of my inventive method is to provide a readout control circuit whereby the voltage vector data and zero vector data are read out from the memory means with preassigned constant cycles each having the aforesaid first and second variable length segments. The readout control circuit must be capable of controlling the relative lengths of the first and second segments of the successive cycles, making the second segment of each cycle shorter for a higher motor speed and longer for a lower motor speed.

As may have been understood from the foregoing, the output frequency of the inverter is varied according to my invention by changing the relative lengths of the two segments of the successive constant cycles with which the voltage vectors and zero vector are generated by the inverter. The number of voltage vectors generated during the first segment of each cycle may vary as the second segment becomes longer or shorter as required for motor speed control. However, unlike the prior art, the intervals of the voltage vectors remain the same.

Consequently, the readout control circuit needs no variable frequency oscillator but only a fixed frequency source of clock pulses for reading out the voltage vectors and zero vector from the memory means. My invention is therefore free from all the above explained weaknesses of the prior art arising from the use of a VCO or like variable frequency source.

The above and other features and advantages of my invention and the manner of realizing them will become more apparent, and the invention itself will best be understood, from a study of the following description and appended claims, with reference had to the attached drawings showing a preferable embodiment of my invention.

DETAILED DESCRIPTION OF THE INVENTION

General

Figure 1:
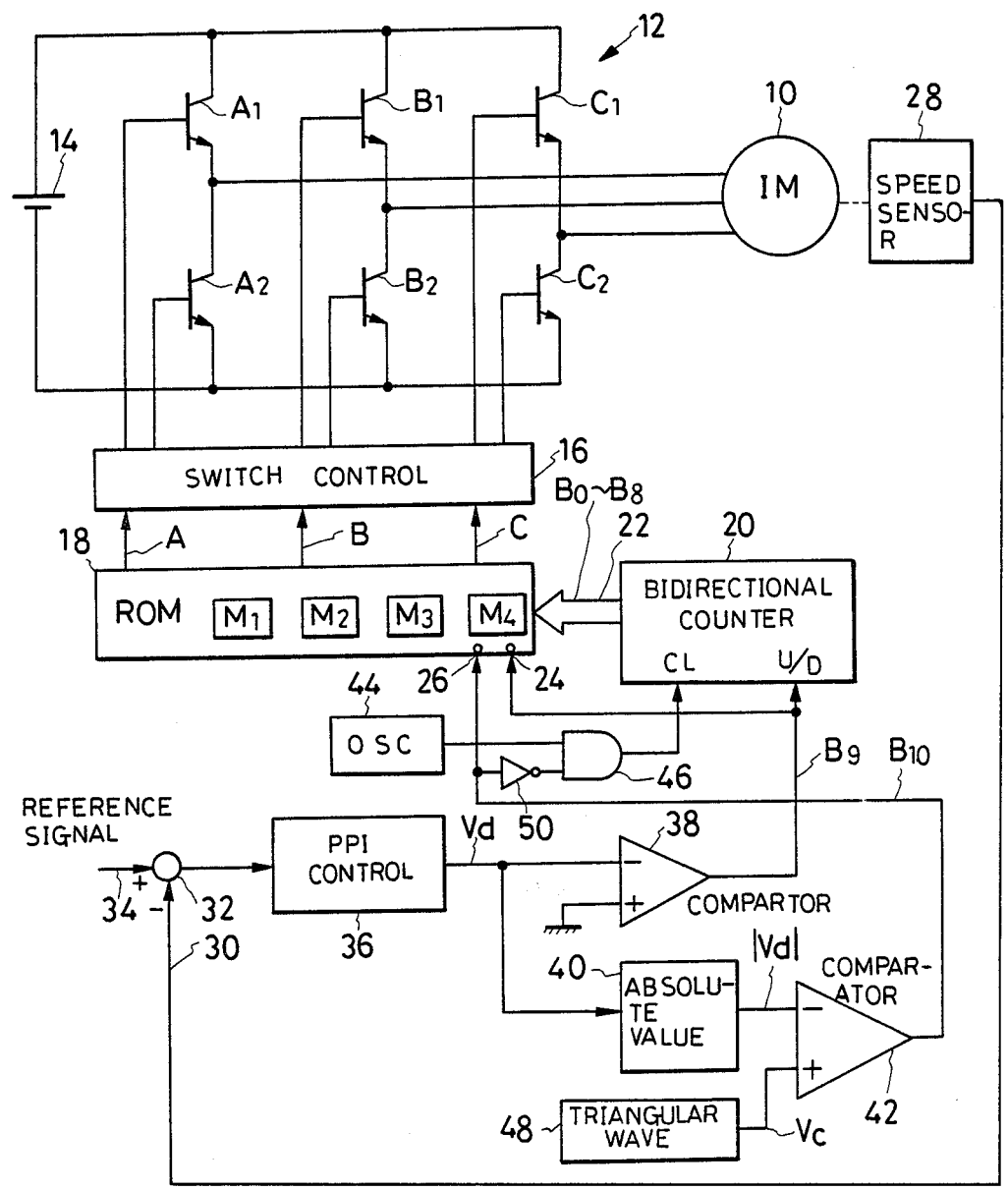
FIG. 1 is a schematic electrical diagram of the AC motor drive system constructed in accordance with the novel concepts of my invention.

I will now describe my invention as adapted for the speed control of a three phase induction motor by a three phase PWM inverter. As illustrated in FIG. 1, the induction motor 10 to be controlled is connected to the PWM inverter 12 which has three pairs of switching devices such as transistors A1 and A2, B1 and B2, and C1 and C2 of bridge connection across a power supply 14. All these switching transistors have their bases connected to a switch control circuit 16 to be activated thereby. The upper group (as seen in FIG. 1) of three transistors A1, B1 and C1 and the lower group of transistors A2, B2 and C2 operate in opposite relation to each other, so that to control the operation of either group is to control the operation of the complete inverter 12.

I have employed for such control of the inverter 12 via the switch control circuit 16 a memory or storage system 18, usually of the read only variety (ROM), which delivers three binary signals A, B and C to the switch control circuit 16 for switching the respective transistors A1, B1 and C1 in various prescribed patterns to be set forth presently. These transistors become conductive when the associated signals A, B and C are binary ONE, and nonconductive when the signals are binary ZERO.

The ROM system 18 has previously written thereon the PWM switching patterns for the PWM control of the inverter 12 in accordance with my invention. This ROM system comprises four constituent memories: A forward PWM switching pattern memory M1, a forward zero vector memory M2, a reverse PWM switching pattern memory M3, and a reverse zero vector memory M4. I will later explain the data stored in these memories under the heading of "Stored Data". Suffice it to say for the moment that the forward PWM switching pattern memory M1 stores voltage vector data used for driving the motor 10 in a forward direction; the forward zero vector memory M2 stores zero vector data used during forward motor driving; the reverse PWM switching pattern memory M3 stores voltage vector data used for driving the motor in a reverse direction; and the reverse zero vector memory M4 stores zero vector data used during reverse motor driving.

Each of the memories M1 through M4 has, typically, 512 storage locations, from Address 0 to Address 511, which are identified by a nine bits binary signal fed from a bidirectional (forward/backward) counter 20 by way of lines 22. However, only one of the four memories M1 through M4 is chosen at one time, and the datum read out from the specified storage location of only this selected memory are actually used for controlling the inverter 12 and hence the motor 10.

In order for its four constituent memories M1 through M4 to be selectively specified as above, the ROM system 18 has a first input terminal 24 for receiving a forward/reverse select signal, and a second input terminal 26 for receiving a zero vector select signal. Either of the forward PWM switching pattern memory M1 and forward zero vector memory M2 is selected when the forward/reverse select signal is binary ZERO, and either of the reverse PWM switching pattern memory M3 and reverse zero vector memory M4 is selected when the forward/reverse select signal is binary ONE. Either of the forward and reverse PWM switching pattern memories M1 and M3 is selected when the zero vector select signal is binary ZERO, and either of the forward and reverse zero vector memories M2 and M4 is selected when the zero vector select signal is binary ONE.

Let the nine bits of the address output from the bidirectional counter 20 be expressed as B0 through B8; the forward/reverse select signal as B9; and the zero vector select signal as B10. The bits B0 through B8 identify each address of all the memories M1 through M4. Further, out of these memories, the forward PWM switching pattern memory M1 is selected when the bits B9 and B10 are "00"; the forward zero vector memory M2 when the bits B9 and B10 are "01"; the reverse PWM switching pattern memory M3 when the bits B9 and B10 are "10"; and the reverse zero vector memory M4 when the bits B9 and B10 are "11". It is thus possible to identify any of the 512 addresses of any of the four memories M1 through M4 of the ROM system 18 by the combinations of the binary values of the nine bits address signal, one bit forward/reverse select signal, and one bit zero vector select signal.

For controlling the output voltages of the inverter 12 via the ROM system 18 and counter 20 in accordance with the actual speed of the motor 10, I have connected a speed sensor 28 such as a speed generator to the motor 10. This speed sensor is coupled via an output line 30 to a comparator 32 for the delivery thereto of an actual motor speed signal indicative of the actual running speed of the motor 10. The comprator 32 also receives by way of a line 34 a reference speed signal representative of a desired speed of the motor 10. The output from the comparator 32, representative of the departure of the actual motor speed from the desired speed, is fed to a proportional plus integral (PPI) circuit 36, which is of the known configuration capable of providing an output proportional to a linear combination of the input and the time integral of the input. I will refer to the output from the PPI circuit 36 as the deviation signal, designated Vd in FIG. 1.

Connected to receive the deviation signal Vd from the PPI circuit 36 are another comparator 38 and an absolute value circuit 40. The comparator 38 has its other input grounded and so functions to determine whether the incoming deviation signal Vd is positive or negative, that is, whether the actual motor speed is higher or lower than the desired speed. The output of this comparator is connected both to the up/down input U/D of the bidirectional counter 20 and to the input 24 of the ROM system 18. The bidirectinal counter 20 counts in either an increasing or decreasing direction depending upon whether the signal (output from the comparator 38) fed to its up/down input U/D is high or low. It will also be seen that the output from the comparator 38 is used as the noted zero vector select signal for the ROM system 18. The absolute value circuit 40 puts out a signal |Vd| representative of the absolute value of the deviation signal Vd. This absolute value signal is directed to still another comparator 42, to which I will refer presently.

At 44 is shown a fixed frequency oscillator as a source of clock pulses having a repetition rate somewhere between 20 and 50 kHz. The oscillator 44 has its output connected to a two input AND gate 46 and thence to a clock input CL of the bidirectional counter 20. It is thus seen that the bidirectional counter 20 inputs the clock pulses only when the signal fed to the other input of the AND gate 46 is high.

A triangular wave generator 48 is connected to the noninverting input of the comparator 42, to whose inverting input is connected as aforesaid the absolute value circuit 40. The triangular wave generator 48 provides a triangular wave voltage Vc at a frequency of, say, 1.5 kHz, which is much lower than the repetition frequency of the clock pulses produced by the oscillator 44. The output of the comparator 42 is connected to the AND gate 46 via a NOT circuit 50 on one hand and, on the other hand, directly to the input 26 of the ROM system 18 for supplying thereto the desired forward-/reverse select signal.

Stored Data

Figures 2, 3:
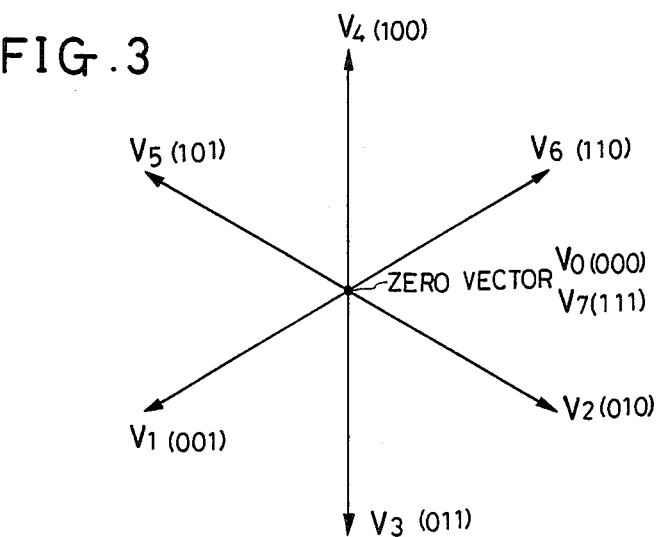
FIG. 2 is a table of an explanatory nature showing part of the voltage vector data and zero vector data stored in the memories used in the drive system of FIG. 1.
FIG. 3 is a schematic illustration explanatory of the voltage vectors and zero vector by which the motor is driven by the system of FIG. 1.

I have schematically and diagrammaticaly illustrated in FIG. 2 the data stored in the ROM system 18. The data are the binary coded representations of six voltage vectors V1 through V6 and two zero vectors V0 and V7. I will define these voltage and zero vectors in the next chapter. Each of the constituent memories M1 through M4 of this memory system has Addresses 0 through 511 as aforesaid. I have shown by way of example the data that are written only in the first four addresses, Addresses 0 through 3, of each memory.

The forward PWM switching pattern memory M1 has the data indicative of successive voltage vectors designated V6, V2, V6 and V2. The forward zero vector memory M2 has the data indicative of zero vectors V7, V0, V7 and V0. The reverse PWM switching pattern memory M3 has the data indicative of voltage vectors V1, V5, V1 and V5. The reverse zero vector memory M4 has the data indicative of zero vectors V0, V7, V0 and V7. Each memory has similar data written on its remaining Addresses 4 through 511.

I have given the vector data of FIG. 2 purely to illustrate the principles of my invention, so that they do not represent the actual data that may be written on the memories in the practice of my invention. The actual voltage vectors stored in Addresses 0 through 84 (corresponding to the angle from 0 to 60 degrees) of the forward PWM switching pattern memory M1 may be: "V6, V6, V6, V6, V2, V2, V2, V2, V2, V2, V6, V6, V6, V6, V2, V2, V2, V2, V2, V2, V6, V6, V6, V6, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V2, V3, V2, V2, V2, V2, V2, V2, V2, V2, V2, V3, V3, V3, V3, V2, V2, V2, V2, V2, V2, V3, V3, V3, and V3."

Voltage Vectors and Zero Vectors

The six voltage vectors V1 through V6 and two zero vectors V0 and V7 which are stored in binary coded data in the ROM system 18 are hereby defined as diagrammatically illustrated in FIG. 3. The transistors A1, B1 and C1 of the inverter 12, FIG. 1, can be switched on or off in the eight different modes of 000, 001, 010, 011, 100, 101, 110 and 111. These are alloted to the vectors V0 through V7 as follows: V0=000, V1=001, V2=010, V3=011, V4=100, V5=101, V6=110 and V7=111.

The binary data representative of the vectors V0 through V7 are written on the ROM system 18 and are read out for delivery to the drive circuit 16 as the motor control data A, B and C in order to variously switch the transistors A1, B1 and C1 of the inverter 12. The voltage vectors V1 through V6 and zero vectors V0 and V7 are to be selectively read out so as to obtain a sinusoidal output voltage and revolving field vector, as explained in more detail hereinbelow.

Selection of Vectors

Figure 4:
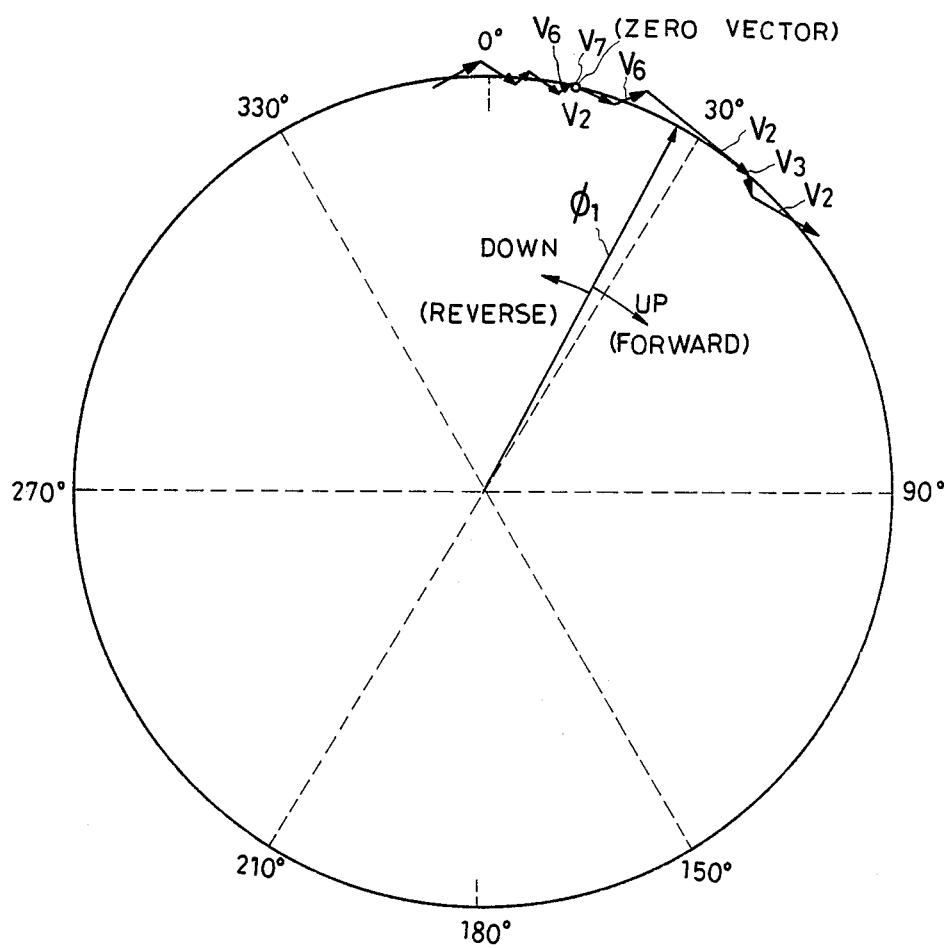
FIG. 4 is a schematic illustration explanatory of the way in which a revolving field vector is set up in the motor by the voltage vectors and zero vector of FIG. 3.

FIG. 4 is explanatory of a possible choice of voltage vectors for the desired revolving field vector $\phi 1$. In order to cause the extremity of the revolving field vector $\phi 1$ to follow a locus that approximates a circle as closely as posible, there may be chosen the sixth and second voltage vectors V6 and V2 from 330° to 30°, the second and third voltage vectors V2 and V3 from 30° to 90°, the third and first voltage vectors V3 and V1 from 90° to 150°, the first and fifth voltage vectors V1 and V5 from 150° to 210°, the fifth and fourth voltage vectors V5 and V4 from 210° to 270°, and the fourth and sixth voltage vectors V4 and V6 from 270° to 330°.

I have shown in FIG. 4 only the voltage vectors V6 and V7 chosen for the angle from 330° to 30°, and the voltage vectors V2 and V3 chosen for the angle from 30° to 90°. Also, in FIG. 4, the zero vector V7 is chosen to terminate the rotation. It will further be noted from this figure that the revolving field vector $\phi 1$ moves in a clockwise direction UP to cause the rotation of the motor 10 in a predetermined forward direction, and in a counter-clockwise direction DOWN to cause the motor rotation in a reverse direction.

I previously set forth, under the heading of "Stored Data", the actual sequence of voltage vectors stored in Addresses 0 through 84 of the forward PWM pattern memory M1 for the angle from 0° to 60°. The remaining Addresses 85 through 511 (corresponding to the angle 60°–360°), then, of the memory M1 may store the vectors in accordance with the above theory of vector selection. For example, in Addresses 85 through 169 corresponding to the angle 60°–120°, the required voltage vectors may be written in the same arrangement as that for Addresses 1 through 84, only with the voltage vectors V6, V2 and V3 for Addresses 1 through 84 replaced by the voltage vectors V2, V3 and V1, respectively, for Addresses 85 through 169.

Operation

During the rotation of the three phase induction motor 10 the speed sensor 28 puts out the actual motor speed signal, for comparison with the reference speed signal by the comparator 32. The deviation signal Vd thus obtained from the PPI circuit 36, representative of the departure of the actual motor speed from the desired speed, is fed to the comparator 38 to determine whether the actual motor speed is higher or lower than the desired speed. Let us assume that the deviation signal Vd is now positive, so that output from the comparator 38 is low. This low output from the comparator 38 is fed to the up/down input U/D of the bidirectional counter 20, causing the latter to count in an increasing direction as long as the comparator output remains low.

Figure 5:
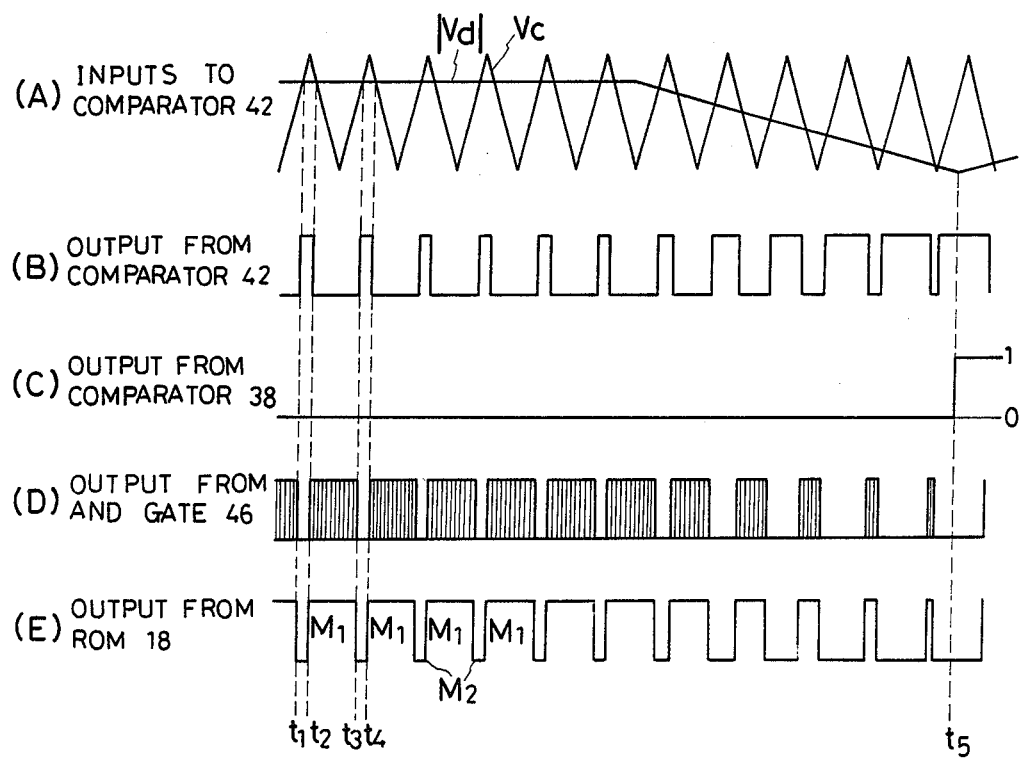
FIG. 5 is a timing diagram explanatory of the operation of the AC motor drive system of FIG. 1.

As indicated at (A) in FIG. 5, the other comparator 42 inputs both the absolute value signal |Vd|, representative of the absolute value of the departure of the actual motor speed from the desired speed, and the triangular wave voltage Vc. The resulting output from this comparator 42 is as plotted at (B) in FIG. 5. It will be noted that the output from the comparator 42 is high when the triangular wave voltage is of greater magnitude than the absolute value of the deviation signal Vd, as from moment t1 to moment t2, and from moment t3 to moment t4, and low when the triangular wave voltage is of smaller magnitude than the absolute value of the deviation signal, as from moment t2 to moment t3.

I have also indicated at (C) in FIG. 5 the output from the comparator 38, which is shown to be low until the moment t5 since we have assumed that the deviation signal Vd is now positive.

Thus, from moment t1 to moment t2, from moment t3 to moment t4, etc., the output (bit B9) from the comparator 38 is low whereas the output (bit B10) from the comparator 42 is high. These outputs from the comparators 42 and 38 are applied to the inputs 24 and 26, respectively, of the ROM system 18, resulting in the choice of the forward zero vector memory M2. From moment t2 to moment t3, etc., the outputs from the comparators 38 and 42 are both low, with the result that the forward PWM pattern memory M1 is selected at the ROM system 18. Such selection of the memories is shown at (E) in FIG. 5.

When the output from the comparator 42 is high, as from moment t1 to moment t2, and from moment t3 to moment t4, the output from the NOT circuit 50 is low, so that the AND gate 46 blocks the passage therethrough of the clock pulses from the oscillator 44. Therefore, not incremented by the clock pulses during these periods, the bidirectional counter 20 continues specifying the same address of the ROM system 18 (or of the forward zero vector memory M2 in the present case) as long as the output from the comparator 42 remains high. On the other hand, when the output from the comparator 42 is low, as from moment t2 to moment t3, the NOT circuit 50 produces a high output, enabling the AND gate 46 to pass the clock pulses therethrough toward the clock input CL of the bidirectional counter 20. Such operation of the AND gate 46 is shown at (D) in FIG. 5.

Figure 6:
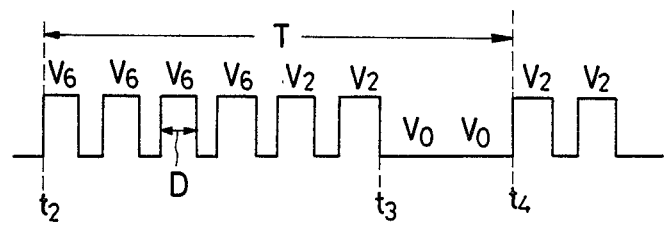
FIG. 6 is a diagrammatic representation of a series of voltage vectors and zero vector that are generated in one cycle of such vectors by the AC motor drive system of FIG. 1.

Since we have assumed that the signal fed from the comparator 38 to the up/down input U/D of the bidirectional counter 20 is low until the moment t5, the value of the nine bits (B0 through B8) output from the bidirectionall counter 20 increases with each input clock pulse from moment t2 to moment t3, sequentially specifying the addresses in the forward PWM pattern memory M1 which is chosen as above during this period. The repetition rate of the clock pulses is so much higher than the frequency of the triangular wave output from the generator 48 that the counter 20 is incremented many times during each period (as from moment t2 to moment t3) when the output from the comparator 42 remains low. Accordingly, during each such period, as many addresses in the memory M1 are specified one after another, and as many voltage vectors are read out sequentially therefrom. FIG. 6 shows such sequential readout of several voltage vectors. The series of six voltage vectors designated V6, V6, V6, V6, V2 and V2 in this figure is by way of example only.

When the output from the comparator 42 goes high at the moment t3, as at (B) in FIG. 5, the clock input to the counter 20 is inhibited, and the counter 20 holds the output that has been being delivered to the ROM system 18 at that moment. Let us assume that the output from the comparator 42 has gone high when the voltage vector V6 is being read out from Address 2 of the forward PWM pattern memory M1 (see FIG. 2). Then, since now the forward zero vector memory M2 is chosen, Address 2 of this memory will be specified, and the zero vector V7 will be read out therefrom. This zero vector V7 will continue to be read out as long as the output from the comparator 42 remains high. When the comparator output goes low at the subsequent moment t4, and when the counter 20 is incremented by the first of the next series of clock pulses, Address 3 of the forward PWM pattern memory M1 will be specified, and the voltage vector V2 will be read out therefrom (FIG. 2).

There are two zero vectors, V0 (000) and V7 (111). As will be understood from a study of FIG. 2, these two zero vectors are so arranged as to require the switching of only one of the transistors A1, B1 and C1.

The complete voltage vector data of the forward PWM pattern, covering the angle from 0 to 360 degrees, are read out with the completion of the production, by the counter 20, of the binary numbers corresponding to the numbers 0 through 511 of the decimal system. The readout of such voltage vector data from the ROM system 18 causes the inverter 12 to produce the approximately sinusoidal, three phase voltage pulses having durations corresponding to the selected voltage vectors, with the consequent creation in the motor 10 of the revolving field vector φ1 that delineates an approximately circular locus.

A comparison of (A) and (B) in FIG. 5 will reveal that the output pulses of the comparator 42 become progressively shorter in duration with a gradual decrease, brought about by the motor control process so far described, in the difference between the actual and desired motor speeds. It is further seen from (E) in FIG. 5 that the periods during which the zero vector V0 or V7 is read out from the forward zero vector memory M2 become progressively longer with the decreasing difference between the actual and desired motor speeds.

Such a decrease in actual motor speed will also take place through a like procedure when the reference speed signal supplied over the line 34 is decreased in magnitude to lower the actual motor speed. The absolute value of the deviation signal Vd will decrease with the decrease in the magnitude of the reference speed signal. The periods during which the zero vector is read out will become pregressively longer, resulting in a decrease in the output frequency and effective output voltage of the inverter 12, until the actual motor speed lowers to the level dictated by the reference speed signal.

With reference back to FIG. 5 it will be noted from (C) that the deviation signal Vd becomes negative after the moment t5 in response to a command for reverse rotation. Then the output from the comparator 38 goes high. The resulting control action is considered self evident from the foregoing desciption of construction and operation.

During the switching of the inverter 12 from one voltage vector to another, each pair of switching transistors A1 and A2, B1 and B2, or C1 and C2 might be shorted and destroyed due to their storages. I would like to suggest the elimination of this possibility by providing a brief transition period from one vector to another during which each pair of transistors are both rendered nonconductive, as in the embodiment disclosed herein.

Figure 7:
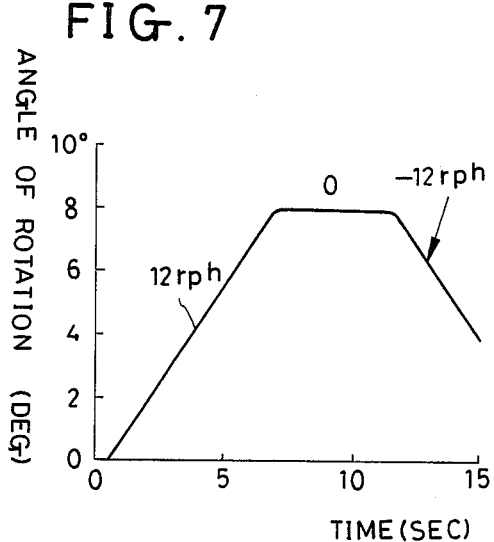
FIG. 7 is a graph plotting the angle of rotation of the motor against time when the motor is driven at 12 revolutions per hour by the AC motor drive system of FIG. 1.
Figure 8:
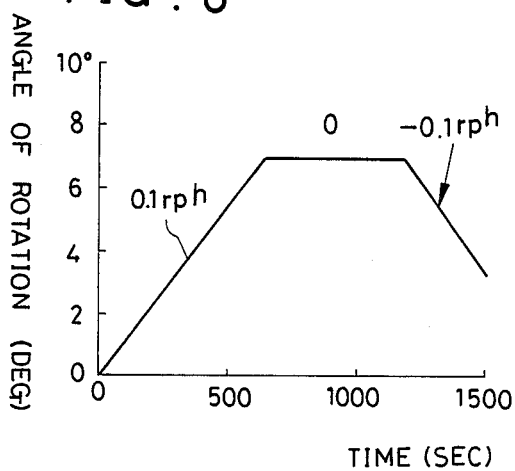
FIG. 8 is a graph plotting the angle of rotation of the motor against time when the motor is driven at 0.1 revolution per hour by the AC motor drive system of FIG. 1.

I have ascertained by experiment that the motor 10 can be bidirectionally driven as above at a speed as low as, for example, 12 revolutions per hour (rph), as in the graph of FIG. 7, or 0.1 rph as in FIG. 8. It will also be observed from these graphs that the complete angle of motor rotation is as small as eight degrees in FIG. 7 and seven degrees in FIG. 8. The motor may of course be driven at much higher speed in accordance with my invention.

Among the advantages gained by my invention, as embodied in the system of FIG. 1, is that the output frequency of the inverter 12 is variable despite the use of the fixed frequency oscillator 44. With reference to FIG. 6 the numbers of voltage vectors read out during the successive cycles T (as from moment t2 to moment t4) of the triangular wave Vc are subject to change depending upon the length of the period (as from moment t3 to moment t4) in each cycle during which the zero vectors are read out. The voltage vectors V6, V6, V6, V6, V2 and V2 read out from moment t2 to moment t3 have each a constant duration D and a constant time interval determined by the fixed output frequency of the oscillator 44. As the number of voltage vectors read out during each period T changes, so does the output frequency of the inverter 12. In other words, the total length of time required for the readout of the complete voltage vector data stored in Addresses 0 through 511 of the memory M1 changes depending upon the time during which the zero vectors V0 and V7 are read out from the memory M2, with the consequent change in the output frequency of the inverter 12. The use of the fixed frequency oscillator 44 in accordance with my invention is, of course, preferable to the conventional practice of employing a variable frequency oscillator for like purposes, the latter being more expensive and complex in construction.

Thus, according to my invention, a change in the output frequency of the inverter 12 is accomplished by changing the number of voltage vectors read out during each cycle T, instead of by changing the output frequency of the oscillator as in the prior art. This feature offers another advantage, that is, that the output frequency of the inverter 12 can be changed immediately when required by the deviation signal Vd. The improved response is due to the fact that a change in the output frequency of the inverter 12 takes place merely by controlling the passage of clock pulses through the AND gate 46.

The above improved response of the FIG. 1 system also accounts for the smooth low speed motor drive made possible by my invention. Another reason for such smooth low speed drive is the constant duration of all the voltage vector pulses. For this reason a decrease in the output frequency of the inverter results in a decrease in the inverter output voltage and, in consequence, in the effective motor input voltage.

It should also be appreciated that I have employed two zero vectors which are stored in the zero vector memory having the same addresses as those of the PWM switching pattern memory storing the voltage vectors. At the time of every changeover from voltage vector to zero vector, as at the moment t1 or t3 in FIG. 5, whichever of the two zero vectors is automatically read out which requires the switching of a smaller number of transistors A1, B1 and C1. Switching losses can thus be reduced appreciably.

An additional advantage is that the motor can be driven in the reverse direction in essentially the same way as in the forward direction. This requires the incorporation of the reverse PWM pattern memory M3 and reverse zero vector memory M4 in the ROM system 18 along with the forward memories M1 and M2.

Despite the foregoing detailed disclosure, I do not wish my invention to be limited by the exact details of the illustrated embodiment. For example, a proportional control or integral control circuit may be substituted for the PPI control circuit 36. As a further alternative, a similar circuit may be connected to the line 30. It is also possible to replace the speed sensor 28 with any device capable of generating a signal indirectly representing the actual motor speed, as in terms of temperature, position, pressure, concentration, etc. These and other modifications or alterations within the usual knowledge of those skilled in the art are considered to fall within the scope of my invention.

I claim:

1. A method of controllably driving an alternating current motor via an inverter having a plurality of switches to be activated in prescribed on off patterns to provide a plurality of voltage vectors for creating a rotary field vector in the motor and a zero vector for arresting the rotation of the field vector, which method comprises:

(a) providing memory means having written thereon both voltage vector data representative of the on off patterns of the inverter switches for the production of the voltage vectors in a predetermined sequence, and zero vector data representative of the on off pattern of the inverter switches for the production of the zero vector;

(b) comparing a motor speed signal indicative of the actual running speed of the motor with a reference signal indicative of a desired speed at which the motor is to be driven, thereby providing a deviation signal representative of the departure of the actual motor speed from the desired speed;

(c) comparing the deviation signal with a triangular wave having a predetermined frequency; and (d) reading out the voltage vector data and zero vector data from the memory means in accordance with the results of the comparison between the deviation signal and the triangular wave for activating the inverter switches so as to cause the inverter to generate the voltage vectors and zero vector accordingly;

(e) the voltage vector data being read out from the memory means when the deviation signal is of greater magnitude than the triangular wave, in order to cause the inverter to generate the voltage vectors in the predetermined sequence and at predetermined time intervals;

(f) the zero vector data being read out from the memory means during all the periods when the deviation signal is of smaller magnitude than the triangular wave, in order to cause the inverter to generate the zero vector.

2. The motor drive method of claim 1 wherin the voltage vector data and zero vector data are read out from the memory means with constant cycles determined by the frequency of the triangular wave, each cycle having a first segment during which the voltage vector data are read out and a second segment during which the zero vector data are read out, the relative lengths of the first and second segments of each cycle being subject to change depending upon the relative magnitudes of the deviation signal and the triangular wave.

3. The motor drive method of claim 1 wherein the memory means has written thereon two different voltage vector data representative of different on off patterns of the inverter switches for the production of the zero vector, and wherein, each time the deviation signal becomes smaller in magnitude than the triangular wave, either of the two voltage vector data is read out that requires the switching of a smaller number of the inverter switches.

4. A system for controllably driving an alternating current motor by a plurality of prescribed voltage vectors for creating a rotary field vector in the motor and by a zero vector for arresting the rotation of the field vector, comprising:

(a) an inverter to be connected to the motor and having a plurality of switches, the voltage vectors and the zero vector being determined by prescribed on off patterns of the inverter switches;

(b) memory means having written thereon both voltage vector data representative of the on off patterns of the inverter switches for the production of the voltage vectors in a predetermined sequence, and zero vector data representative of the on off pattern of the inverter switches for the production of the zero vector;

(c) a switch control circuit for activating the inverter switches as dictated by the voltage vector data and zero vector data read out from the memory means;

(d) deviation signal means for comparing a motor speed signal indicative of the actual running speed of the motor with a reference signal indicative of a desired speed at which the motor is to be driven and for providing a deviation signal representative of the departure of the actual motor speed from the desired speed;

(e) a triangular wave source for providing a triangular wave having a predetermined frequency;

(f) a comparator for comparing the deviation signal with the triangular wave;

(g) readout means for reading out the voltage vector data and zero vector data from the memory means in accordance with the results of the comparison between the deviation signal and the triangular wave, the readout means reading out the voltage vector data when the deviation signal is of greater magnitude than the triangular wave, and reading out the zero vector data during all the periods when the deviation signal is of smaller magnitude than the triangular wave;

(h) a source of clock pulses having a repetition rate lower than the frequency of the triangular wave;

(i) a counter connected to the memory means for successively specifying storage locations of the voltage vector data and zero vector data in the memory means in a predetermined sequence when incremented by the clock pulses; and (j) gate means connected between the clock pulse source and the counter for gating the clock pulses, the gate means being further connected to the comparator for permitting the clock pulses to increment the counter when the deviation signal is of greater magnitude than the triangular wave.

5. The motor drive system of claim 4 wherein the counter is a bidirectional counter capable of counting the clock pulses in both increasing and decreasing directions, and wherein the readout control circuit further comprises a circuit connected between the deviation signal means and the bidirectional counter for causing the latter to count the clock pulses in an increasing direction when the deviation signal is positive, and in a decreasing direction when the deviation signal is negative.

6. The motor drive system of claim 4 wherein the memory means has written thereon two different voltage vector data representative of different on off patterns of the inverter switches for the production of the zero vector, and wherein the readout control circuit is adapted to read out, during the second segment of each cycle, either of the two voltage vector data which requires the switching of a smaller number of the inverter switches.

7. The motor drive system of claim 6 wherein the memory means comprises:

(a) a first memory having stored thereon the voltage vector data covering one alternating current cycle of the motor; and (b) a second memory having as many storage locations as does the first memory and having stored thereon the two zero zector data in a prescribed arrangement.

8. The motor drive system of claim 7 wherein the memory means further comprises:

(a) a third memory having stored thereon a series of voltage vector data for driving the motor in a reverse direction; and (b) a fourth memory having stored in a prescribed arrangement thereon the zero vector data for use when the motor is being driven in the reverse direction.

9. The motor drive system of claim 4 wherein the motor is a three phase induction motor, and the inverter is a three phase bridge inverter.

* * * * *